United States Patent [19]

Kops

[11] Patent Number: 4,489,605
[45] Date of Patent: Dec. 25, 1984

[54] BALANCING MACHINE FOR LARGE ROTATABLE PARTS

[75] Inventor: Earl A. Kops, San Diego, Calif.

[73] Assignee: Donald O. Gillman, San Diego, Calif. ; a part interest

[21] Appl. No.: 453,600

[22] Filed: Dec. 27, 1982

[51] Int. Cl.³ ............................................. G01M 1/16
[52] U.S. Cl. ........................................ 73/455; 73/482
[58] Field of Search ................. 73/455, 471, 472, 482, 73/486

[56] References Cited

U.S. PATENT DOCUMENTS 2,350,077  5/1944  Smith ................................. 73/484 X
3,250,132  5/1966  Rued et al. ......................... 73/472 X

*Primary Examiner*—James J. Gill
*Attorney, Agent, or Firm*—Frank D. Gilliam

[57] ABSTRACT

A machine for balancing large rotatable parts such as marine propellers in the plane of rotation. A swing assembly hangs from a support assembly such as two spaced posts on a stand by means of two or more thin metal sheets which extend from the support assembly to the bottom of the swing assembly. The rotatable part is centered on the top end of a vertical arbor mounted for rotation about a vertical axis in a vertical column on said swing assembly. As the arbor and part are rotated, any imbalances causes a deflection of the swing in a plane perpendicular to the thin metal sheets which act as sensitive leaf springs. Deflection is measured by an indicator adjacent to the swing. Since the metal sheets are very strong in tension, very heavy parts can be tested. These sheets, due to their length and slight thickness, are easily deflected sideways by very small off-center loads. Thus, small imbalances can be detected, measured and corrected.

10 Claims, 6 Drawing Figures

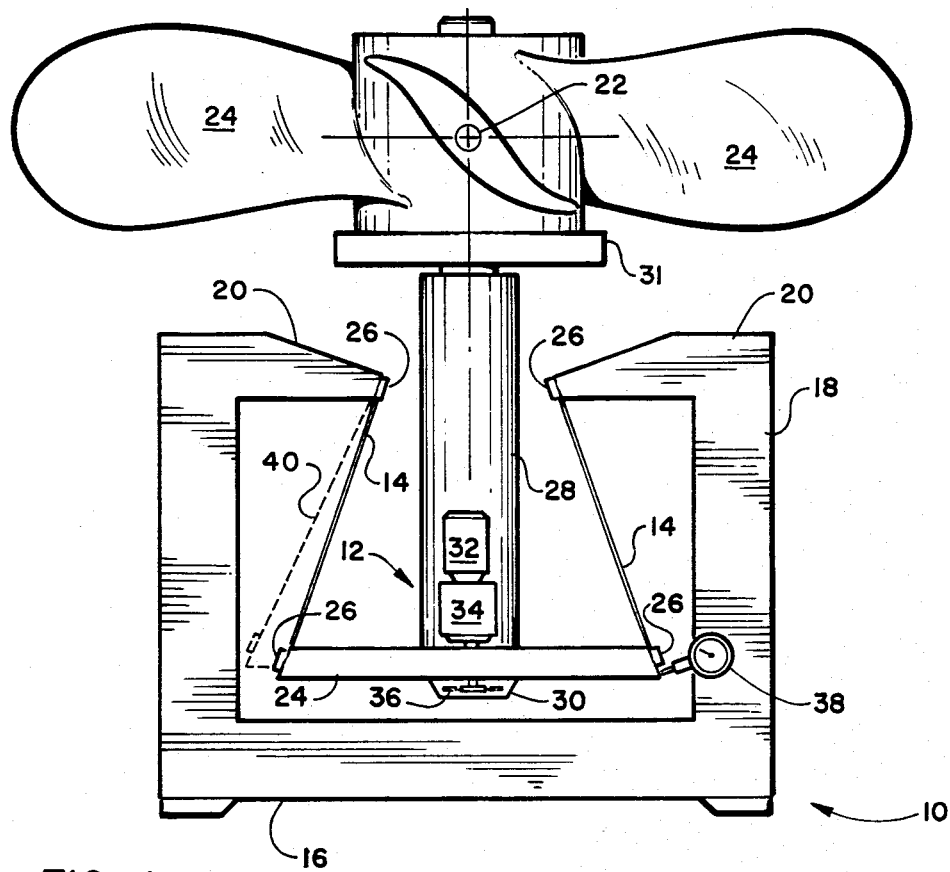
FIG. 1
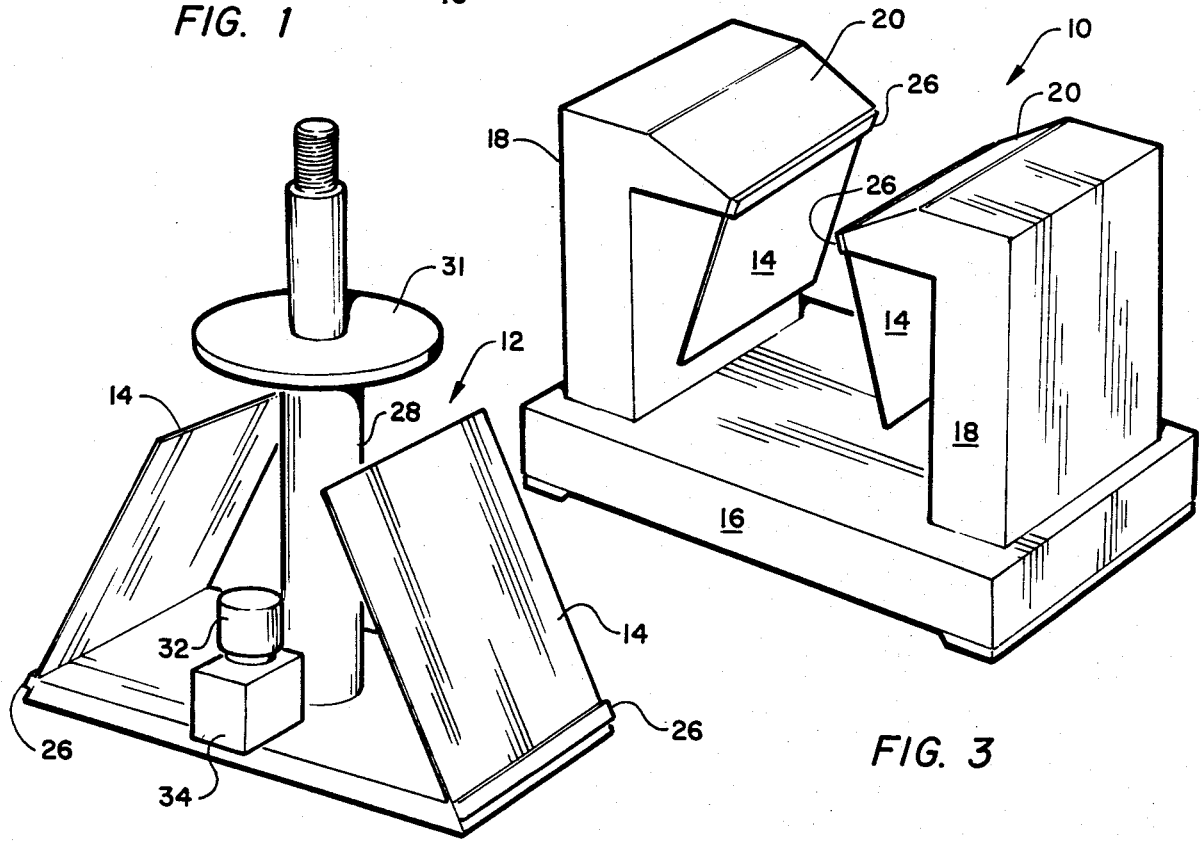
FIG. 2
FIG. 3

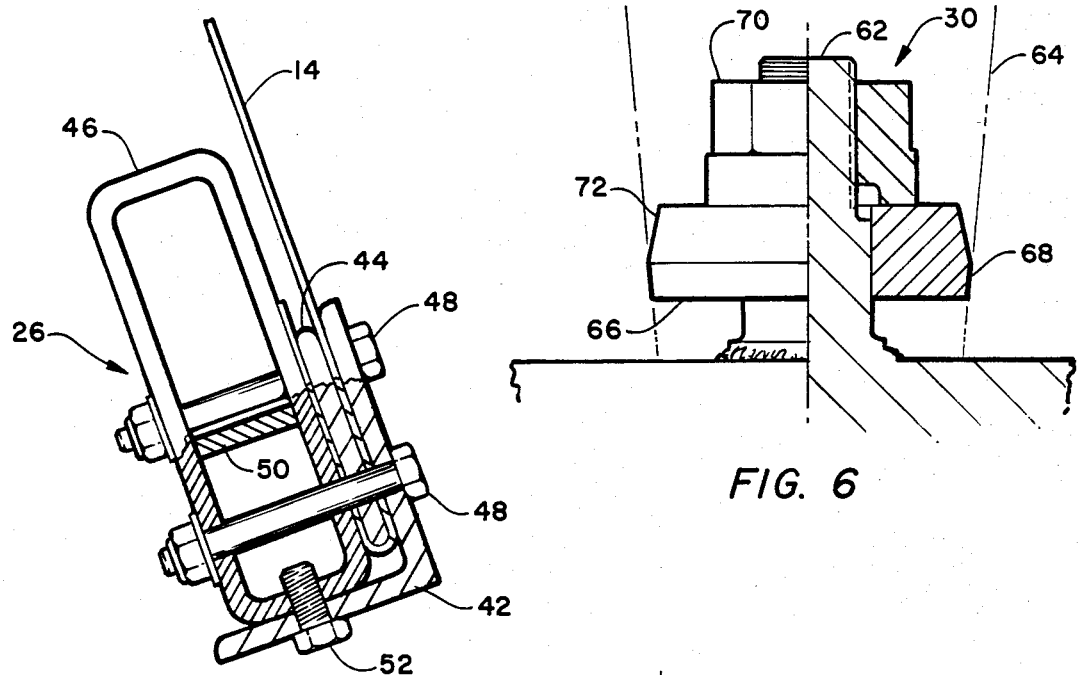
FIG. 4
FIG. 6
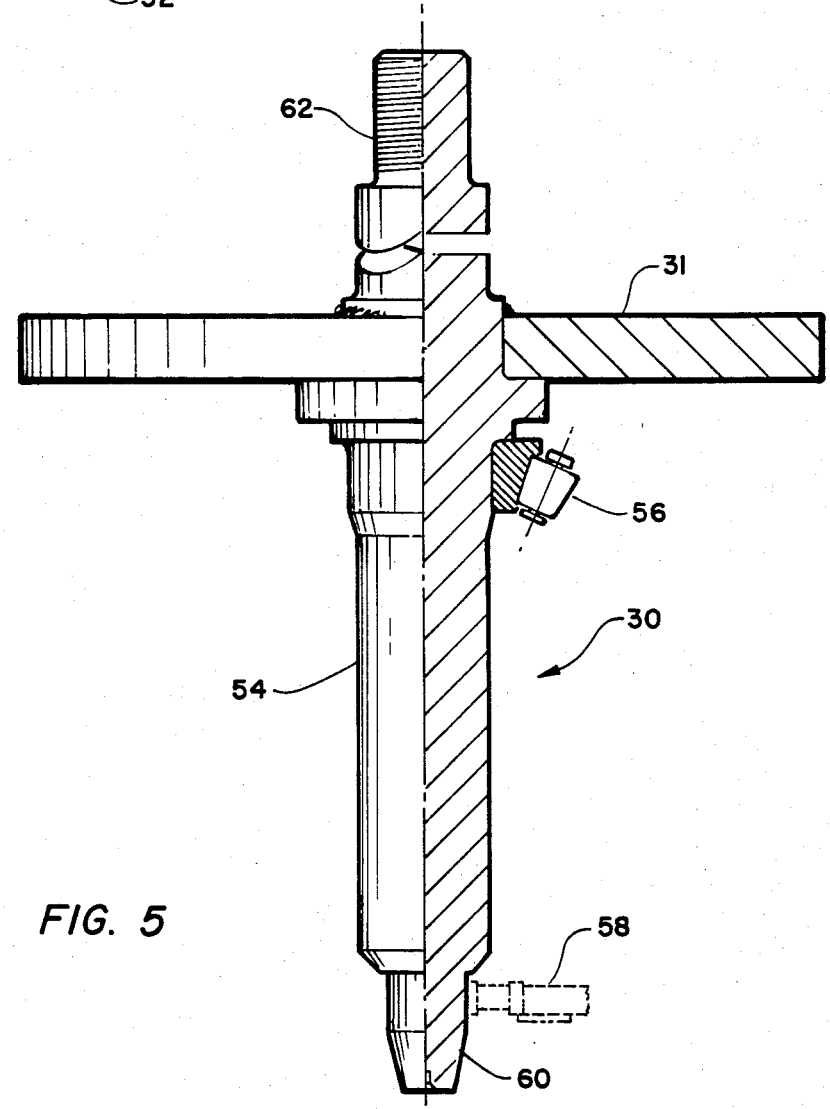
FIG. 5

BALANCING MACHINE FOR LARGE ROTATABLE PARTS

BACKGROUND OF THE INVENTION

This invention relates in general to the balancing of rotating bodies and, more specifically, to the detection and correction of very small imbalances in large rotatable bodies such as marine propellers or very large gears.

A wide variety of machines have been developed for balancing rotating bodies such as automobile wheels. These machines hold the wheel at the end of a horizontal arbor and rotate the wheel while measuring vibration caused by the unbalanced conditions. These machines do not have the capacity to permit balancing of large, heavy parts, because of the cantilevered arbor.

Present practice for checking balance of marine propellers, large gears, etc., is to insert a heavy arbor through the propeller or the like so that the ends of the arbor can be set into spaced sets of bearings or rollers. The axis of the arbor is thus horizontal and the propeller can turn about this axis while supported by the rollers. The axis of the arbor is thus horizontal and the propeller can turn about this axis while supported by the rollers. Typical of this arrangement is that shown in U.S. Pat. No. 3,478,602 to Tatum. This arrangement prevents lateral and longitudinal movement but permits rotation about the arbor axis. If one blade of the propeller is heavy, it tends to rotate the propeller until that blade is low. Balance is then achieved by grinding metal from the heavy blade until no further imbalance is detected. Unfortunately, friction in the bearings of the rollers tends to restrain rotation, restricting the accuracy of the balancing.

Attempts have been made to mount the rotatable part on a vertical arbor mounted on a cradle which is supported by flexible plates. Typical of these is the machine described by Karpchuk in U.S. Pat. No. 3,024,361. The cradle is mounted on vertical flexible plates which tend to bend when an unbalanced part is rotated on the arbor, to indicate the degree and area of imbalance. However, these flexible plates which support the weight of the cradle and rotatable part in compression must be relatively thick and sturdy. Also, the plates must be strong enough to resist the bending moment caused by rotation of a severely out-of-balance part. Thus, these flexible plates do not provide the desired degree of sensitivity and accuracy in balancing large parts such as large gears, marine propellers or the like. Another major disadvantage of this system is the required high rotational speed to detect small imbalances. This system relies on centrifugal forces of the imbalances to induce deflection sufficient for practical measuring. Rotational speeds to detect small imbalances can become hazardous when working with massive articles.

Therefore, there is a continuing need for machines for vary accurately balancing large rotatable parts.

SUMMARY OF THE INVENTION

The above noted problems, and others, are overcome by suspending the article and its support on thin sheet metal tension members which, due to their thinness, act as sensitive leaf springs. The support for the article incorporates bearings with a vertical axis such that the article can be rotated slowly (or incrementally turned). Two tension/leaf springs are sloped upward and inward such that the geometry of lateral motion creates a swing assembly comprising the article and its support which pivots about the intersection of the upward extended lines of the leaf springs. If this intersection (pivot point) coincides substantially with the centroid of the article being tested, then the test article remains laterally motionless through small swing angles. Static imbalances of the test article induce angular deflections of the swing assembly. Such deflections of the swing assembly can be readily measured by a dial indicator or other suitable measuring instruments. Calibration of angular deflections versus imbalance (mass times movement arm) gives a direct indication of mass changes required to correct the imbalances. Weight can be removed from the heavy side (or added to the light side) of the test article to bring it into balance. Once the test article is balanced there is no tendency for the assembly to swing and/or more laterally as it is rotated or repositioned.

The accuracy of the balancing is influenced by the sensitivity of the springs alone. A thin metal sheet can be made to support several tons of weight when in tension. This same sheet, due to its length and thinness, can easily be deflected sideways by a very minor load. This results in the extremely accurate balance achieved by the machine of this invention.

BRIEF DESCRIPTION OF THE DRAWINGS

Details of the invention and of a preferred embodiment thereof will be further understood upon reference to the drawing, wherein:

FIG. 1 is a schematic evaluation view of the balancing machine with a marine propeller in place for balancing;

FIG. 2 is a schematic perspective view of the swing portion of the machine with the sheet metal springs in place;

FIG. 3 is a schematic perspective view of the stand portion of the machine with the thin metal springs in place;

FIG. 4 is a detail view, partly in section, of one end of the upper and lower leaf spring clamping means;

FIG. 5 is an elevation view, partly in section, of the arbor; and

FIG. 6 is a detail evaluation view, partly in section of the automatic centering means for attachment of rotatable parts to the upper end of the arbor.

DETAILED DESCRIPTION OF THE INVENTION

Referring now to FIGS. 1–3, there is seen a main support assembly or stand generally designated 10 (shown alone in FIG. 3) which supports a swing assembly generally designated 12 (shown alone in FIG. 2) by a pair of thin metal leaf springs or tension members 14. Stand 10 includes a base 16 and a pair of upstanding posts 18. While springs 14 could be attached directly to the upper ends of the posts, it is preferred that springs 14 attach to the inward ends of arms 20. As best seen in FIGS. 2 and 3, springs 14 are relatively wide, generally having a width of at least ½ their length.

While the supporting stand 10 comprising base 16 and posts 18 is preferred, any other suitable support assembly having at least two elevated spaced attachment points could be used. For example a concrete structure having an appropriately shaped cavity in the top capable of accepting the swing assembly could be used, with the upper ends of the springs 14 fastened to the upper edges of the cavity. Also, while two springs 14 are shown in the preferred embodiment, a greater number of springs could be used if desired. The springs should be arranged to permit deflection of the swing assembly in one direction while restraining movement in another direction, generally 90° to the first direction.

I have found that maximum sensitivity is obtained where the springs 14 angle upward toward a point 22 which is near the center of gravity of the part (here, propeller 24) being balanced. This configuration is, therefore, preferred.

Springs 14 are fastened to arms 20 and to the edges of lower plate 24 of swing assembly 12 by any suitable securing means, such as clamps 26. A very effective, and therefore preferred, clamping arrangement is described below in conjunction with the description of FIG. 4. A column 28 extends perpendicular to plate 24 up between arms 20. An arbor 30, detailed in FIGS. 5 and 6, is journaled within column 28. propeller 24 rests on a disk 31 secured to arbor 30. A motor 32 and gearbox 34 are provided to rotate arbor 30 at a slow speed, typically about 1 rpm. Arbor drive can be accomplished in any conventional manner, such as by a friction drive means or gear 36 which engages the surface of arbor 30 or a gear mounted at the end of arbor 30. While a drive means to continuously rotate the arbor at slow speeds is preferred, if desired the arbor can instead be simply moved incrementally through a full circle while measuring deflection at a number of positions to determine imbalance.

Imbalance of propeller 24 is measured by conventional dial indicator 38, shown only in FIG. 1. For example, if the right-hand blade of propeller 24, as seen in FIG. 1, is heavy, swing 12 will be deflected to the left as indicated by broken lines 40 and the deflection will be measured by indicator 38. The deflection shown schematically at 40, is, of course, exaggerated for clarity, since actual deflection will ordinarily be a small fraction of an inch.

Details of a preferred clamping means 26 for securing springs 14 to arms 20 and base 24 are provided in FIG. 4. The upper and lower clamps may be identical, the upper clamps being merely inverted relative to the lower clamps.

Each clamp 26 includes an elongated angle structural member 42 which is fastened to either base 24 or arm 20 by any conventional means (not shown) such as welding, bolts or the like. Spring 14 is wrapped around an elongated spacer bar 44 which is clamped between angle 42 and elongated box section 46 by bolts 48. Preferrably, the end of spacer 44 around which spring 14 passes is semi-circular in cross-section to minimize stresses on the spring. A wedge block 50 may be welded inside box section 46 as shown as a reinforcement next to the bolt 48. A bolt or cap screw 52 directly secures box section member 46 to angle 42. If the interior of box section 52 is reasonably accessible, short bolts with nuts inside of the box section may be used in place of the longer bolts 48 shown.

The arbor 30 mounted for rotation within column 28 is shown in greater detail in FIG. 5. Arbor 30 consists essentially of a shaft 54 and disk 31. Disk 31 is a shrink fit over the shaft, is welded thereto, then the upper surface of disk 31 is machined to 90° to the shaft axis. A large tapered roller bearing 56 is mounted in the top of column 28 and a roller bearing 58 is mounted near the bottom of column 28. These bearings are schematically indicated only on the right side of FIG. 5 for clarity. A gear (not shown) or a friction bearing surface may be provided, as desired at the lower end 60 of shaft 54 for engagement with the drive means shown in FIG. 1. If desired, motor 32 and gearbox 34 may be mounted near the top of column 28 and may engage a sprocket on arbor 30 just below disk 31, accessed through an opening in column 28. At the upper end 62, the shaft is threaded for a nut (not shown) to retain the rotatable part to be balanced.

The means for mounting the rotatable part is detailed in FIG. 6. The inner wall of marine propellers, many large gears, etc., are tapered for exact centering on a shaft. The inner wall of such a part is schematically indicated at 64. A spacer 66 having an outer portion with a taper corresponding to the taper of part 64 is forced downwardly into uniform contact with wall 64 by nut 70. This produces exact centering on the shaft. If a part to be balanced has a cylindrical bore, either corresponding cylindrical spacers will be used or a greater taper on the spacer (such as shown at 72) can be used to center the part on arbor 30.

While various specific parts, dimensions and relationships have been described in conjunction with the above description of a preferred embodiment, these can be varied, as described above, with similar results.

Other applications, variations and ramifications of the present invention will occur to those skilled in the art upon reading this disclosure. These are intended to be included within the scope of this invention, as defined in the appended claims.

I claim:

1. A machine for precisely determining the static balance of large rotatable parts which comprises:
    a vertical rotatable arbor adapted to support a large rotatable part;
    a swing means supporting said arbor;
    means for aligning the center of said part with the axis of rotation of said arbor;
    support means spaced from said arbor and higher in elevation than said swing means said support means comprises a generally horizontal base member and two spaced upstanding posts with two inwardly extending arms at the top of said posts;
    at least two spaced thin sheet metal tension members attached to said swing means and to said support means, each of said tension members is secured to said arms and lower plates by a clamping means comprising an elongated spacer bar adapted to having an end of a tension member wrapped 180° therearound, the edge of said spacer bar around which said tension member is wrapped having approximately semi-circular cross-section, two clamping plates arranged in contact with said tension member on opposite sides of said spacer bar, a plurality of fasteners extending through said clamping plates, tension member and spacer bar to hold them together in a tight clamping relationship and means for securing at least one of said clamping plates to the appropriate arm or lower plate;
    said tension members extending upwardly and inwardly from said swing means to said support means whereby said swing means hangs from said support means;
    said tension members arranged to permit said swing means to deflect in one direction and retain said swing means in another direction; and
    measuring means for measuring deflection of said swing assembly.

2. The machine according to claim 1 wherein the planes of said tension members, if extended upwardly, would meet at approximately the center of gravity of a rotatable part mounted on said arbor.

3. The machine according to claim 1 further including a drive means mounted on said swing assembly for rotating said arbor relative to said swing assembly.

4. The machine according to claim 1 wherein the assembly of said arbor and said column comprises:
   at least one bearing between arbor and column permitting rotation of the arbor relative to the column;
   a disk secured to said arbor near the upper end thereof having an upper surface substantially perpendicular to the axis of said arbor and adapted to support the lower side of a part to be balanced;
   a tapered spacer adapted to slide closely over the upper end of said arbor and further adapted to enter the axial bore of the part to be balanced; and
   a nut threadedly engaging a threaded uppermost end portion of said arbor;
   whereby as said nut is threaded downwardly onto said arbor, the expanding taper of said spacer is forced into said part bore to center said part on said arbor.

5. A machine for precisely determining the static balance of large rotatable parts which comprises:
   a support means having a base and at least two elevated spaced attachment points;
   upper securing means at said attachment points;
   a swing assembly adapted to being positioned above said base between said attachment points, said swing assembly comprising a horizontal lower plate and an upstanding vertical central column;
   lower securing means at the ends of said lower plate;
   at least two leaf spring means each held at one end by one of said upper securing means and at the other by one of said lower securing means, whereby said swing assembly hangs from said springs above said base;
   said upper and lower securing means comprise an elongated spacer bar adapted to having an end of said spring wrapped 180° therearound, the edge of said spacer bar around which said spring is wrapped having an approximately semi-circular cross-section, two clamping plates arranged in contact with said spring on opposite sides of said spacer bar a plurality of fasteners extending through said clamping plates, spring and spacer bar to hold them together in a tight clamping relationship, and means for securing at least one of said clamping plates to the appropriate arm or lower plate;
   a vertical arbor mounted within said column for rotation about a vertical axis relative to said swing assembly;
   centering support means at the upper end of said arbor for holding large rotatable parts for rotation with said arbor; and
   measuring means for measuring deflection of said swing assembly during rotation of said arbor.

6. The machine according to claim 5 wherein said support means comprises a generally horizontal base member and at least two spaced upstanding posts.

7. The machine according to claim 5 wherein said upper securing means are each attached to the inner end of arms which extend inwardly toward said arbor so that the planes of said springs, if extended upwardly, would meet at approximately the center of gravity of a rotatable part mounted on said arbor.

8. The machine according to claim 5 wherein said leaf springs are thin sheet metal members having widths equal to at least about one-third the length of said springs between upper and lower clamping means.

9. The machine according to claim 5 wherein the assembly of said arbor and said column comprises:
   at least one bearing between arbor and column permitting rotation of the arbor relative to the column;
   a disk secured to said arbor near the upper end thereof having an upper surface substantially perpendicular to the axis of said arbor and adapted to support the lower side of a part to be balanced;
   a tapered spacer adapted to slide closely over the upper end of said arbor and further adapted to enter the axial bore of the part to be balanced; and
   a nut threadedly engaging a threaded uppermost end portion of said arbor;
   whereby as said nut is threaded downwardly onto said arbor, the expanding taper of said spacer is forced into said part bore to center said part on said arbor.

10. The machine according to claim 5 further including a drive means mounted on said swing assembly for rotating said arbor relative to said swing assembly.

* * * * *